United States Patent
Watanabe

[15] 3,687,044
[45] Aug. 29, 1972

[54] FOCAL PLANE SHUTTER DEVICE
[72] Inventor: Koichiro Watanabe, Tokyo, Japan
[73] Assignee: Asahi Kogaku Kogyo Kabushiki Kaisha, Tokyo-to, Japan
[22] Filed: Jan. 20, 1971
[21] Appl. No.: 107,883

[30] Foreign Application Priority Data
Jan. 28, 1970    Japan..........................45/8152

[52] U.S. Cl..............................................95/57
[51] Int. Cl.............................................G03b 9/32
[58] Field of Search.........................................95/57

[56] References Cited

UNITED STATES PATENTS

| | | | |
|---|---|---|---|
| 3,515,049 | 6/1970 | Knapp | 95/57 |
| 3,029,721 | 4/1962 | Muller | 95/57 |
| 2,512,815 | 6/1950 | Swensson | 95/57 |
| 3,138,083 | 6/1964 | Thomas et al. | 95/57 |

Primary Examiner—Samuel S. Matthews
Assistant Examiner—Michael L. Gellner
Attorney—Steinberg & Blake

[57] ABSTRACT

A focal plane shutter drive for simultaneously cocking and sequentially releasing the leading and trailing curtains of a focal plane shutter. One of a pair of coaxial curtain gears is formed with an arcuate slot while the other carries a pin received in this slot for engaging an end thereof to provide for simultaneous turning of both gears during cocking of the shutter. A cocking gear is coaxial with the curtain gears and all of the gears are supported for free rotation independently of each other about their common axis. A releasable motion transmission extends between the cocking gear and one of the curtain gears for transmitting motion therebetween during cocking of the shutter, this transmission being interrupted preparatory to sequential release of the curtain gears. This motion transmission is situated in its entirety between the common axis of the gears on the peripheries thereof so that an exceedingly compact, light-weight assembly is provided.

10 Claims, 4 Drawing Figures

Patented Aug. 29, 1972
3,687,044
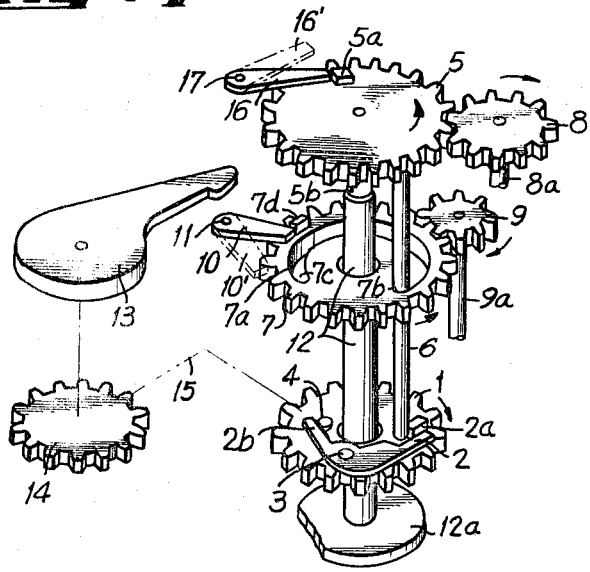
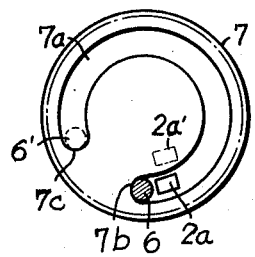 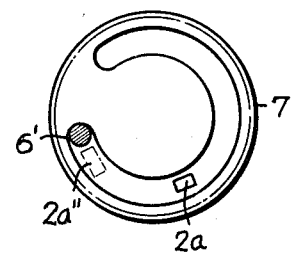
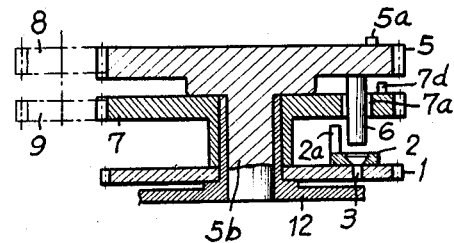
INVENTOR
KIOCHIRO WATANABE
BY
Steinberg and Blake
ATTORNEYS

FOCAL PLANE SHUTTER DEVICE

BACKGROUND OF THE INVENTION

The present invention relates to cameras.

In particular, the present invention relates to cameras which have focal plane shutters, and the invention relates specifically to the drive for a focal plane shutter.

In conventional focal plane shutter drives a cocking gear is mounted on a shaft independent of that on which one of the curtain gears is mounted and a clutch is situated in the transmission of the drive to the cocking gear. In addition it is known to provide between the cocking gear and one of the curtain gears either a direct meshing or an interconnection through a suitable clutch.

These known constructions create serious disadvantages in that they occupy an undesirably large amount of space and the weight of the components is undesirably large so that the inertia of the moving masses makes it difficult for the parts to operate effectively at the desired speed. A further disadvantage of these known structures resides in the fact that they require a relatively large number of components creating complexities which give rise to faulty operation.

SUMMARY OF THE INVENTION

It is accordingly a primary object of the present invention to provide a focal plane shutter drive which will avoid the above drawbacks.

It is in particular an object of the present invention to provide a focal plane shutter drive of this type which can operate effectively with a focal plane shutter of the double-shaft type.

The objects of the present invention also include the provision of a device of this type which is characterized by exceedingly small dimensions for the components, achieving a high degree of miniaturization, while at the same time providing also an exceedingly simple structure characterized by low friction and inertia to achieve an efficient, high-speed operation.

Although single-shaft type of shutters have been common in 35 mm cameras, shutters of the double-shaft type have been used more and more in cameras such as single-lens reflex cameras, in order to achieve a higher degree of miniaturization. However, even in double-shaft types of shutters, there has been a requirement of an undesirably large number of parts which occupy a relatively large space within the camera, resulting in undesirable complications in the structure and preventing the desired miniaturization from being achieved. It is thus among the object of the present invention to avoid these drawbacks.

According to the invention, the focal plane shutter drive includes a pair of coaxial curtain gears for respectively simultaneously cocking the shutter curtains and for sequentially releasing them. One of the curtain gears is formed with an arcuate slot extending along a circle whose center is in the common axis of the gears while the other of the curtain gears fixedly carries a pin which is received in the slot to engage one end thereof during simultaneous turning of the gears when the shutter is cocked. A cocking gear is coaxial with the curtain gears and a support means supports all of the gears for free rotation independently of each other about their common axis. A releasable motion-transmitting means is operatively connected with the cocking gear and one of the curtain gears for transmitting motion therebetween during cocking of the shutter, with the releasable motion-transmitting means being in a release position preventing transmission of motion from the cocking gear to the curtain gears after the shutter is cocked. In accordance with one of the features of the invention this releasable motion-transmitting means is situated in its entirety closer to the common axis of the gears than the peripheries of the gears, so as to achieve a highly miniaturized and exceedingly compact structure.

BRIEF DESCRIPTION OF DRAWINGS

The invention is illustrated by way of example in the accompanying drawings which form part of this application and in which:

FIG. 1 is a schematic perspective illustration of a focal plane shutter drive according to the invention, the parts being shown in FIG. 1 in an exploded view with certain components extended for clearly illustrating the interrelation between the components;

FIG. 2 is a schematic plan view of the trailing curtain gear showing this gear and parts which cooperate therewith in the position they assume when the shutter is cocked;

FIG. 3 is a schematic plan view of the trailing curtain gear showing this gear and parts associated therewith in the position they assume after an exposure has been made and the shutter has run down; and FIG. 4 is a sectional elevation, taken in a plane which contains the common axis of the gears, and illustrating more precisely the actual relationship between the components, although it is to be understood that in an actual camera, the components may have a size smaller than that shown in FIG. 4.

DESCRIPTION OF PREFERRED EMBODIMENTS

Referring now to FIG. 1, cocking of the shutter is provided by way of cocking lever 13 fixed to a gear 14 so that the latter is turned in response to turning of the lever 13. This lever 13 is turned in a well known manner in order to cock the shutter. The gear 14 may mesh directly with a cocking gear 1 so as to rotate the latter, or an intermediate transmission 15, consisting of one or more transmission gears or the like, may be situated between the gears 14 and 1.

A leading curtain gear 5 is coaxial with the cocking gear 1. Between the coaxial gears 5 and 1 is a trailing curtain gear 7 which is also coaxial with the gears 1 and 5. The leading curtain gear 5 directly drives a pinion 8 fixed to a curtain shaft 8a on which the leading curtain is wound and from which it is unwound, while the trailing curtain gear 7 meshes directly with a pinion 9 fixed to a rotary shaft 9a forming the other curtain shaft on which the trailing curtain is wound and from which it is unwound.

The several gears 1, 5, and 7 are carried by a support means 12 which supports the gears for rotation independently of each other about their common axis. Thus, as is shown most clearly in FIG. 4, the leading curtain gear 5 has a central shaft 5b received in a bearing sleeve formed by a tubular portion of the support means 12. The cocking gear 1 surrounds the tubular portion of the support means 12 and is supported thereby for free rotation, while the intermediate trailing curtain gear 7 also surrounds the tubular bearing portion of the support means 12 in the manner shown in FIG. 4.

A releasable motion-transmitting means is provided for transmitting motion from the cocking gear 1 to the leading curtain gear 5. This releasable motion-transmitting means includes a projecting portion 2a fixed to and projecting from a lever 2 which forms a means for placing the projecting portion 2a in its operative motion-transmitting position and for displacing it to a nonoperative position where the motion transmission is interupted. A pivot pin 3 is carried by the cocking gear 1 and supports the lever 2 for swinging movement on the gear 1. This lever 2 has an extension 2b engaging a stop pin 4 (FIG. 1) which is carried by the gear 1, so that the extent of displacement of the projecting portion 2a of the releasable motion-transmitting means from the common axis of the gears is limited by the pin 4. However, this projecting portion 2a can be swung inwardly toward the common axis of the gears.

The trailing curtain gear 7 is formed with an arcuate slot 7a extending along a circle whose center is in the common axis of the gears. This slot terminates in opposed ends 7b and 7c.

A releasable holding means is provided for releasably holding the trailing curtain gear in its cocked position. This releasable holding means includes a projection 7d fixed to and projecting from the gear 7 and a releasable holding lever 10 supported on a pin 11 and adapted to engage the projection 7d, as shown in FIG. 1, for maintaining the gear 7 in its cocked position.

The gear 5 has a drive pin 6 fixed thereto and extending parallel to the common axis of the gears. The drive pin 6 extends through and beyond the slot 7a. It terminates in a free end portion which forms the other projecting portion of the releasable motion-transmitting means, so that the free end portion of the drive pin 6 and the projecting portion 2a form the pair of projecting portions of the releasable motion-transmitting means which engage each other for transmitting motion from the cocking gear 1 to the leading curtain gear 5. It will be noted that this releasable motion-transmitting means is situated in its entirety between the common axis of the gears and the peripheries of the gears. The lever 2 can be turned to situate the projecting portion 2a at the same radial distance from the common axis of the gears as the pin 6 so as to transmit a drive therebetween, and the lever 2 can be turned to situate the projecting portion 2a closer to the common axis than the pin 6 so as to terminate the transmission of motion.

During cocking of the shutter, the gear 1 is turned in a clockwise direction, as shown by the arrow in FIG. 1, while the projecting portion 2a of the releasable motion-transmitting means is situated in its outer motion-transmitting position determined by engagement of the pin 4 with the extension 2b of the lever 2. This rotation of the cocking gear 1 is brought about from the gear 14 upon actuation of the cocking lever 13, as pointed out above. At this time the projecting portion 2a engages the projection portion formed by the free end of the drive pin 6, so that the leading curtain gear 5 is turned in a clockwise direction, opposite to that indicated by the arrow on the gear 5 in FIG. 1. The drive pin 6 at this time engages the end 7b of the slot 7a, so that the trailing curtain gear 7 is constrained to rotate together with the leading curtain gear 5 during cocking of the shutter. Of course, at this time both of the pinions 8 and 9 are simultaneously rotated so that the leading trailing curtains move in unison to the cocked position of the shutter. When the cocked position is reached the leading curtain gear 5 is prevented from turning further by a suitable means which is not illustrated and which is well known.

When the drive is released for making an exposure, the leading curtain gear 5 will turn in advance of the trailing curtain gear 7, gear 5 turning at this time in the direction indicated by the arrow on gear 5 in FIG. 1, but before this release takes place, just before the gear 5 is released from the cocking force, a releasable holding means formed by a projecting portion 5a of the gear 5 and a lever 16, which swings on a pin 17, is brought into play with the lever 16 engaging the projection 5a so as to hold the gear 5 in its cocked position. Simultaneously the trailing curtain gear 7 is prevented from running down by the action of the lever 10 on the projection 7d of the releasable holding means which coacts with the trailing curtain gear 7.

The action of the releasable holding means formed by the lever 10 and the projection 7d is brought about when the pin 6, engaging the end 7b of the slot 7a, situates the trailing curtain gear 7 in its cocked position. The relationship between these components when the shutter is cocked is illustrated in FIG. 2.

In order to release the shutter, the shutter plunger or button is actuated and through an unillustrated transmission the lever 2 is swung so as to displace the projecting portion 2a from the solid line position shown in FIG. 2 into the dot-dash line position 2a'. Simultaneously the lever 16 is moved from the solid line position of FIG. 1 to the dot-dash line position 16'. Thus, the leading curtain gear 5 is released and is rotated by the restoring force which acts on the leading curtain, the rotation being transmitted from the shaft 8a through the pinion 8 to the gear 5. Thus, at this time, while the trailing curtain retains stationary so as to open the shutter, the drive pin 6 moves along the slot 7a until it reaches the position 6' indicated in FIG. 2. At this moment a suitable means coacts with the bear 5 to restrain the latter against further movement. It is to be noted that the drive pin 6 does not move into engagement with the end 7c of the slot 7. When the pin 6 reaches the position 6' indicated in FIG. 2 the rotation of the gear 5 is terminated through an unillustrated means other than the end 7c of the slot 7a.

In order to terminate the exposure, the lever 10 is moved by an unillustrated means well known in conventional cameras to the position 10' indicated in dot-dash lines in FIG. 1. The interval between displacement of the lever 16 to the position 16' and displacement of the lever 10 to the position 10' will provide between the leading and trailing curtains of the shutter an opening the duration of which corresponds to the selected exposure time. The result of displacing the lever 10 to the position 10' is that the trailing curtain gear 7 is released for counterclockwise rotation in the direction of the arrow shown in FIG. 1 adjacent the gear 7, and this rotation is of course derived through the force acting on the trailing curtain, this force being transmitted through the shaft 9a and the pinion 9 to the trailing curtain gear 7. This rotary movement of the trailing curtain gear 7 during running down of the shutter is terminated by engagement of the end 7b of the slot 7a with the drive pin 6 which is now in the position 6', and at the end of the running down operation of the shutter, the trailing curtain gear 7 will have the position indicated in FIG. 3.

When the operator releases the shutter-actuating button, the lever 2 is returned by the action of an unillustrated spring to a position where its extension 2b engages the stop pin 4, so that now the projecting portion 2a of the motion-transmitting means is displaced back from the position 2a' into the position indicated in solid lines in FIG. 3.

It is to be noted that at this time when the cocking operations are again repeated the projecting portion 2a will move freely from the solid line position shown in FIG. 3 up to position 2a'' before engaging the drive pin so as to simultaneously turn both of the curtain gears until the parts again reach the cocked position illustrated in FIG. 2. Thus, while the curtain gears rotate within an angular range determined by the length of the slot 7a, the cocking gear 1 is free to rotate through a full revolution, and when the initial turning of the cocking gear 1 is provided at the beginning of the cocking operation, no actual cocking takes place until the projection 2a of the releasable motion-transmitting means reaches the free end of the drive pin 6. Then, all of the gears 1, 5 and 7 are simultaneously rotated in a clockwise direction, as viewed in FIGS. 1-3 in unison, to the position indicated at FIG. 2 where the gear 5 is restrained against further rotation by the unillustrated restraining means.

With conventional drives for focal plane shutters of the single-shaft or double-shaft type, the gears which correspond to the gears 1 and 5 are respectively mounted on separate shafts and are not coaxial. Also, in the conventional structures these gears mesh with each other. Consequently, when the shutter is released the gear 1 is necessarily rotated together with the gear 5, thus resulting in rotation of the gear which corresponds to the gear 14. It has been conventional to provide a clutch between gears 1 and 14 in order to selectively disconnect these gears. The result is that such conventional construction has been exceedingly complex and has components of relatively large mass and inertia as compared with the structure of the invention.

With the structure of the invention the gears 1 and 5 do not mesh with each other so that the mass and inertia of components which rotate during running down of the shutter particularly are substantially reduced. Of course, it is possible to provide an operative connected between the gears 1 and 5 through the lever 2 and the shaft 5b of the gear 5 by downward extension of the latter shaft and provision of a suitable clutch, but such an arrangement is highly disadvantageous in that a much larger space would be required by the components and undesirable complexities would be encountered. Also, situating the gear 1 between the gears 5 and 7 would be disadvantageous in that it would not be possible to limit the mechanism associated with the gear 1 to the small dimensions which are achieved with the invention and the functioning of the mechanism would not be as effective as that of the invention.

Thus, with the present invention the transmission of motion between the cocking gear 1 and the curtain gear 5 is provided at a location between the common axis of the gears and the peripheries thereof, and the gear 1 is completely disconnected from the gear 5 during running down of the shutter so that upon release of the shutter it is unnecessary to rotate any components except those extending between the gears 5 and 7 and the shutter itself. In this way an exceedingly compact, highly miniaturized assembly is achieved, and at the same time the masses which move during operation of the shutter are exceedingly small.

What is claimed is:

1. In a focal plane shutter drive, a pair of coaxial curtain gears for simultaneously cocking and separately releasing leading and trailing shutter curtains, one of said gears being formed with an arcuate slot extending along a circle whose center is in the common axis of said gears and the other of said gears fixedly carrying a drive pin extending into said slot for engaging an end thereof to provided for simultaneous rotation of both gears during cocking of the shutter while said pin and slot enable said gears to rotate sequentially upon release of the shutter, a cocking gear coaxial with said curtain gears, support means supporting all of said gears for rotation independently of each other about their common axis, and releasable motion-transmitting means extending between said cocking gear and one of said curtain gears for transmitting motion therebetween during cocking of the shutter and for releasing said cocking gear from the latter curtain gear in preparation from releasing the shutter, said motion-transmitting means being situated in its entirety between the common axis of said gears and the peripheries of said gears.

2. The combination of claim 1 and wherein said releasable motion-transmitting means includes a pair of projecting portions respectively carried by said cocking gear and that one of said curtain gears to which motion is transmitted by said motion-transmitting means, said projecting portions being situated at the same radial distance from said common axis during transmission of motion by said motion-transmitting means, and means connected with one of said projecting portions for displacing the latter to a location at a different radial distance from said common axis than the other projecting portion for preventing transmission of motion by said motion-transmitting means.

3. The combination of claim 2 and wherein said one projecting portion is carried by said cocking gear and said means for displacing said one projecting portion with respect to said common axis including a lever turnable on said cocking gear and carrying said one projecting portion.

4. The combination of claim 3 and wherein said other projecting portion is formed by a free end portion of said drive pin.

5. The combination of claim 4 and wherein said curtain gear which is formed with said slot is situated between said curtain gear which carries said drive pin and said cocking gear, said drive pin extending through and beyond said slot and having its free end portion situated in overlapping relationship with respect to said projecting portion carried by said lever with both of said projecting portions situated at the same radial distance from said axis when motion is transmitted by said motion-transmitting means.

6. The combination of claim 5 and wherein said curtain gear which carries said drive pin is a leading curtain gear and is adapted to be connected with the leading curtain of the shutter for cocking said leading curtain and releasing the latter in advance of the trailing curtain while the other curtain gear is adapted to be connected with the trailing curtain of the shutter for cocking the trailing curtain simultaneously with the cocking of the leading curtain and for releasing the trailing curtain subsequent to the release of the leading curtain, so that said pin moves along said slot when the leading curtain is released while said slot moves around said pin when the trailing curtain is released.

7. The combination of claim 6 and wherein a pair of releasable holding means are respectively connected operatively with said curtain gears for releasably holding them in their cocked positions and for sequentially releasing first said leading curtain gear then said trailing curtain gear.

8. The combination of claim 7 and wherein a pair of rotary pinions respectively mesh with said leading and trailing curtain gears, and a pair of curtain winding shafts respectively fixed to said pinions.

9. The combination of claim 6 and wherein said curtain gears are turnable one with respect to the other through an angular range within the angular length of said slot while said cocking gear is turnable through a greater angular range.

10. The combination of claim 9 and wherein said cocking gear is turnable through a full revolution.

* * * * *